United States Patent
Liu et al.

(10) Patent No.: US 11,645,166 B2
(45) Date of Patent: May 9, 2023

(54) METHOD, DEVICE AND COMPUTER PROGRAM PRODUCT FOR BACKUPING DATA

(71) Applicant: EMC IP Holding Company LLC, Hopkinton, MA (US)

(72) Inventors: Qin Liu, Chengdu (CN); Yi Jiang, Chengdu (CN); Wenhao Dai, Chengdu (CN); Jiang Fu, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 377 days.

(21) Appl. No.: 16/863,042

(22) Filed: Apr. 30, 2020

(65) Prior Publication Data

US 2021/0109819 A1 Apr. 15, 2021

(30) Foreign Application Priority Data

Oct. 12, 2019 (CN) .......................... 201910967192.6

(51) Int. Cl.
*G06F 11/14* (2006.01)
*G06F 16/2455* (2019.01)
*G06F 18/214* (2023.01)
*G06F 18/243* (2023.01)

(52) U.S. Cl.
CPC ...... *G06F 11/1464* (2013.01); *G06F 11/1451* (2013.01); *G06F 16/24568* (2019.01); *G06F 18/214* (2023.01); *G06F 18/24323* (2023.01)

(58) Field of Classification Search
CPC ............. G06F 11/1464; G06F 11/1451; G06F 16/24568; G06K 9/6256; G06K 9/6282
See application file for complete search history.

(56) References Cited

U.S. PATENT DOCUMENTS

| 7,574,461 B1* | 8/2009 | Armorer | G06F 11/1458 |
| 2006/0026110 A1* | 2/2006 | Fan | G06N 20/00 |
| | | | 706/12 |
| 2017/0199887 A1* | 7/2017 | Fullbright | G06F 16/113 |
| 2020/0258008 A1* | 8/2020 | Shaker | G06F 17/18 |
| 2021/0203434 A1* | 7/2021 | She | H04L 43/0829 |

OTHER PUBLICATIONS

Hang Yang et al., "A Very Fast Decision Tree Algorithm for Real-Time Data Mining of Imperfect Data Streams in a Distributed Wireless Sensor Network", Oct. 6, 2012 (16 pages).

* cited by examiner

*Primary Examiner* — Alford W Kindred
*Assistant Examiner* — Tiffany Thuy Bui
(74) *Attorney, Agent, or Firm* — Chamberlain, Hrdlicka, White, Williams & Aughtry

(57) ABSTRACT

Embodiments of the present disclosure provide a method, device and computer program product for backing up data. The method comprises obtaining a data attribute of specific data to be backed up from a client to a server, a resource utilization rate at the client, and a network condition between the client and the server. The method further comprises setting, based on the data attribute, the resource utilization rate and the network condition, a plurality of parameters for performing stream backup, wherein the plurality of parameters at least comprises a concurrent number of stream transmission and a concurrent number of data parsing. The method further comprises parsing, according to the set plurality of parameters, the specific data and backing up the specific data from the client to the server.

17 Claims, 3 Drawing Sheets

METHOD, DEVICE AND COMPUTER PROGRAM PRODUCT FOR BACKUPING DATA

CROSS-REFERENCE TO RELATED APPLICATIONS

This application claims priority to Chinese Application No. 201910967192.6 filed on Oct. 12, 2019. Chinese Application No. 201910967192.6 is hereby incorporated by reference in its entirety.

FIELD

Embodiments of the present disclosure generally relate to the field of data storage, and more specifically, to a method, a device and a computer program product for backing up data.

BACKGROUND

Users usually store files and data in a backup system to avoid data loss, so the backup system often can store a large amount of data. In case of data failure or disaster, data may be recovered via the backup system to avoid unnecessary loss. The types of data backup may be classified into full backup, incremental backup, differential backup and selective backup, etc. The data backup may also be divided into hot backup and cold backup based on whether the system is in a normal operating state.

As a technology of transmitting data in a stable and continuous stream, a stream transmission can increase transmission speed by concurrent data transmission, where the concurrent data transmission refers to taking full advantage of network bandwidth, segmenting data to be transmitted into several slices and creating a plurality of streams for concurrent transmission of these slices. Stream backup refers to backing up data from a backup client to a backup server in the form of stream transmission. In general, concurrent stream backup can boost data backup speed.

SUMMARY

Embodiments of the present disclosure provide a method, a device and a computer program product for backing up data, which can automatically and intelligently set the optimization parameters of stream backup based on the actual environment of the stream backup to reduce human costs and achieve real-time adjustment of the optimization parameters, thereby enhancing the execution efficiency of the stream backup.

In one aspect of the present disclosure, there is provided a solution for backing up data. The method includes obtaining a data attribute of specific data to be backed up from a client to a server, a resource utilization rate at the client, and a network condition between the client and the server; setting, based on the data attribute, the resource utilization rate and the network condition, a plurality of parameters for performing stream backup, the plurality of parameters at least comprising a concurrent number of stream transmission and a concurrent number of data parsing; and parsing, according to the set plurality of parameters, the specific data and backing up the specific data from the client to the server.

In another aspect of the present disclosure, there is provided an electronic device for backing up data. The electronic device comprises a processing unit; and a memory coupled to the processing unit and storing instructions. The instructions, when executed by the processing unit, cause the device to perform acts including obtaining a data attribute of specific data to be backed up from a client to a server, a resource utilization rate at the client, and a network condition between the client and the server; setting, based on the data attribute, the resource utilization rate and the network condition, a plurality of parameters for performing stream backup, the plurality of parameters at least comprising a concurrent number of stream transmission and a concurrent number of data parsing; and parsing, according to the set plurality of parameters, the specific data and backing up the specific data from the client to the server.

In a further aspect of the present disclosure, there is provided a computer program product tangibly stored on a non-transitory computer-readable medium and including computer-executable instructions, the computer-executable instructions, when executed, causes a computer to perform the method or process in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of respective embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
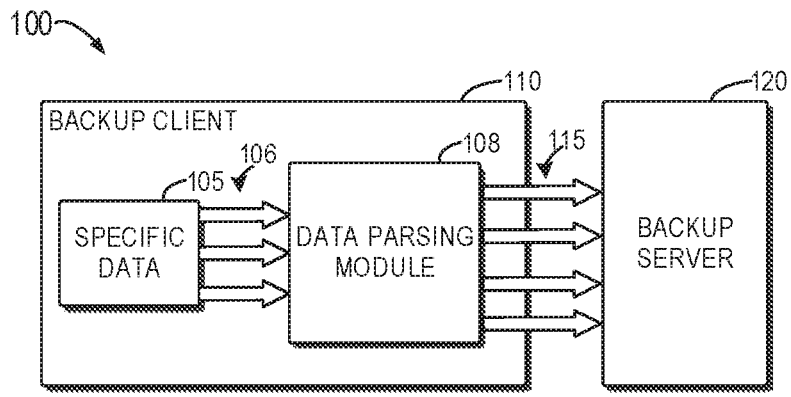
FIG. 1 illustrates a schematic diagram of an example architecture of an example backup system in accordance with embodiments of the present disclosure.

Preferred embodiments of the present disclosure will be described in more detail below with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless indicated otherwise.

In a data backup scenario, some optimization parameters, such as a concurrent number, may be configured to improve data backup efficiency. Traditionally, there are two approaches for configuring the optimization parameters. One approach is to set same optimization parameters for all scenarios; however, the same optimization parameters are not suitable for all kinds of real scenarios because practical environment factors vary from one data backup scenario to another. The other approach relates to artificially or manually configuring the optimization parameters, which is difficult for most users. As a result, technical support staffs and even research staff (when technical support staffs fail to provide a solution) are required to participate in the aforementioned configuration, which increases human costs. Moreover, the optimization parameters may need to be constantly adjusted due to the diversity and complicity of backup scenarios, while manual configuration cannot complete this adjustment in real time. Hence, the optimization parameter configuration in traditional data backup either lacks accuracy and appropriateness, or costs too many human resources and fails to make real-time adjustments, thus impacting the execution efficiency of the stream backup.

To this end, embodiments of the present disclosure provide a solution of automatically setting optimization parameters of the stream backup. When a stream backup is performed, embodiments of the present disclosure can automatically and intelligently set the optimization parameters of the stream backup based on the actual environment of the stream backup to reduce human costs and achieve a real-time adjustment of the optimization parameters, thereby enhancing the execution efficiency of the stream backup. Moreover, according to some embodiments of the present disclosure, a decision tree model can be trained according to artificial intelligence and machine learning technology, and then optimization parameters of the stream backup are automatically determined by the decision tree model.

Basic principles and several example implementations of the present disclosure are explained below with reference to FIGS. 1 to 6. It should be understood that these example embodiments are provided merely for enabling those skilled in the art to better understand and further implement embodiments of the present disclosure, without limiting the protection scope of the present disclosure in any manner.

FIG. 1 illustrates a schematic diagram of architecture of an example backup system 100 in accordance with embodiments of the present disclosure. As shown in FIG. 1, the backup system 100 includes a backup client 110 and a backup server 120, where the backup client 110 may back up the data therein to the backup server 120 in real time on a periodic or aperiodic basis, to ensure data security. According to embodiments of the present disclosure, the backup client 110 may be a client installed on certain machines. It should be appreciated that although FIG. 1 only demonstrates one backup client and one backup server, the backup system 100 may include more backup clients and/or more backup servers.

In addition to backing up files in a common file system, the backup client 110 may also be used for some specific types of data, such as database, virtual machine file (e.g., Hyper-v, vCenter), email files (e.g., Exchange) and the like. A small change in these specific types of specific data will lead to a large change of the whole file. For example, a new piece of data inserted into a database will lead to a great change in the entire database file. However, if the files of the whole database are directly backed up to a backup server, it will result in a large volume of data backup, and also result in an extremely low de-duplication rate. Therefore, for these specific types of the specific data, before the execution of data backup, it is required to parse the specific data in the backup client.

As shown in FIG. 1, the backup client 110 includes a data parsing module 108, which can parse the specific types of specific data 105 to extract changed data, as shown by arrow 106, and then it is possible to only backup some changed data. Afterwards, the data parsing module 108 backs up the data to be backed up to the backup server 120 in a stream fashion as shown by arrow 115. In this way, the specific data are parsed into stream formats with respective rules to fulfill a high de-duplication rate. In general, it is required that various types of specific data are respectively adapted to respective data parsing modules.

Although stream backup brings a high de-duplication rate, it also makes the backup client 110 more complicated so that the performance and stability of respective backup tasks is difficult to guaranteed. Therefore, optimization parameters should be set for specific backup clients and/or backup scenarios to optimize the execution performance of the stream backup. As shown by arrow 106 in FIG. 1, a concurrent number of data parsing may be set to accelerate data parsing speed. Likewise, as shown by arrow 115, a concurrent number may be set for stream transmission to accelerate data transmission speed. However, the concurrent number, if being excessive or inappropriate, may cause resource preemption, which affects the processing speed and even leads to failure of the backup task. Accordingly, it is required to accurately and intelligently determine suitable optimization parameters in different backup scenarios.

Generally, data de-duplication and virtual synthesizing technology may improve data transmission efficiency. Original data are divided, using the data de-duplication technology, into fixed or variable chunks represented by hash values and a partition algorithm ensures that the same data chunks always generate the same hash values. If the same data chunk has already been transmitted and stored, there is no need to transmit the data chunk, thereby saving the data transmitted over network and decreasing capacity consumed by storage.

Figure 2:
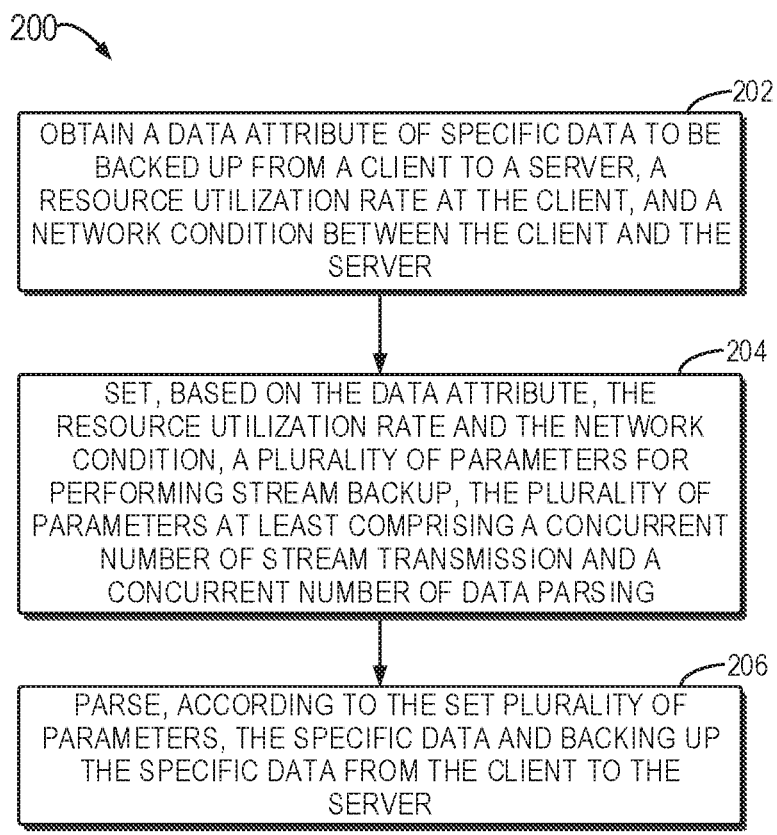
FIG. 2 illustrates a flowchart of a method for backing up data in accordance with embodiments of the present disclosure.

FIG. 2 illustrates a flowchart of a method 200 for backing up data in accordance with embodiments of the present disclosure. To provide a better description, the method 200 is explained herein with reference to the backup system depicted in FIG. 1.

A data attribute of specific data to be backed up to a backup server from a client, a resource utilization rate at the client and a network condition between the client and the server are obtained at 202. For example, when it is required to back up the specific data in the stream way, an environment parameter in the stream backup scenario is obtained, where the specific data may be a database, a virtual machine file or an email file etc. There are many factors influencing the performance of the stream backup, mainly including data attributes to be backed up, hardware resource usage conditions and network conditions. Therefore, considering these influencing factors, embodiments of the present disclosure determine and select appropriate optimization parameters automatically.

In some embodiments, these influencing factors may specifically include a type of specific data, a size of specific data, a proportion of new bytes in the specific data, a utilization rate of a processing resource at the client, a utilization rate of a storage resource at the client and a utilization rate of input/output resources at the client. Alternatively, the influencing factors may also include a duration of last backup, and a network bandwidth and a network latency between the client and the server.

At 204, a plurality of parameters for performing the stream backup is set based on the data attribute, resource utilization rate and network condition, wherein the plurality of parameters at least includes a concurrent number of stream transmission and a concurrent number of data parsing. The inventor discovered that the execution efficiency of the stream backup can be improved by setting some parameters. Therefore, embodiments of the present disclosure automatically set some optimization parameters according to values of a plurality of influencing factors. In some embodiments, besides the concurrent number of stream transmission and the concurrent number of data parsing, the optimization parameters may also include a size of a buffer area (which may be set in the data parsing module 108) for storing parsed data and a chunk size (i.e., a size of a data slice) of stream transmission.

At 206, based on the plurality of set parameters, the specific data is parsed and backed up to from the client to the server. For example, the data parsing module 108 described with reference to FIG. 1 concurrently parses the specific data 105 based on the concurrent number of data parsing (e.g., 3) and the backup client 110 concurrently transmits the data to the backup server 120 according to the concurrent number of stream transmission (such as 4).

Therefore, during performing the stream backup, embodiments of the present disclosure can automatically and intelligently configure, based on the actual environment of the stream backup, the optimization parameters of the stream backup to lower human costs and can also realize adjusting the optimization parameters in real time, thereby increasing the execution efficiency of the stream backup.

Figure 3:
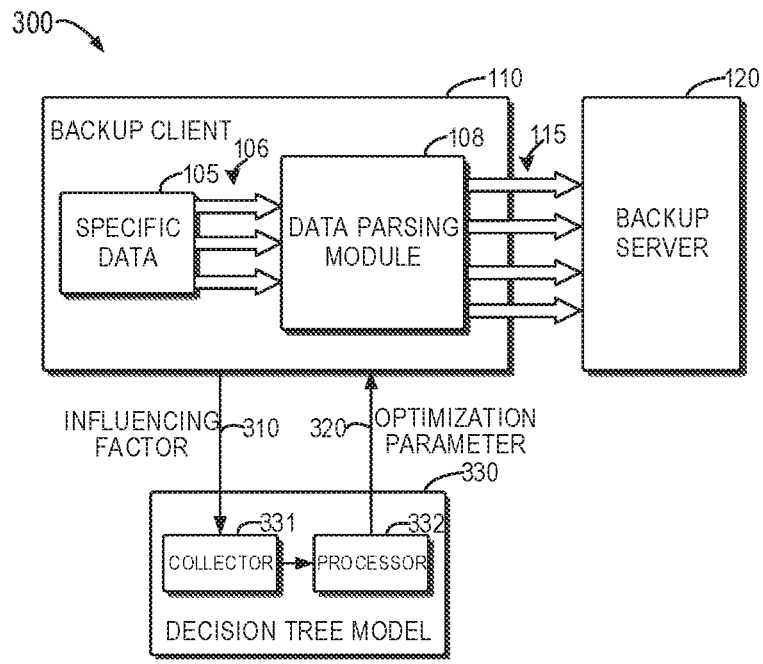
FIG. 3 illustrates a schematic diagram of an example environment in which optimization parameters of the stream backup are automatically configured by a decision tree model in accordance with embodiments of the present disclosure.

FIG. 3 illustrates a schematic diagram of an example environment 300 in which optimization parameters of the stream backup are automatically configured by a decision tree model in accordance with embodiments of the present disclosure. Compared with FIG. 1, FIG. 3 further includes the decision tree model 330 in accordance with embodiments of the present disclosure.

As shown in FIG. 3, the decision tree model 330 may include a collector 331 and a processor 332, where the collector 331 is used for collecting from respective backup clients' backup historical data and client statistical data as training data, and passing the training data to the processor 332 for machine learning. Each record in the training data at least includes a data attribute, a resource utilization rate, a network condition and corresponding optimization parameters. The processor 332 performs training based on the historical data and the statistical data received from the collector 331 to build the decision tree model 330.

Continue to refer to FIG. 3, when it is required to perform the stream backup, the backup client 110 collects influencing factors 310 affecting the performance of the stream backup and sends the influencing factors 310 to the trained decision tree model 330, where the influencing factors may include a data attribute of the special data to be backed up, a utilization rate of hardware resources at the client and a network condition between the client and the server etc. According to the received influencing factors 310, the decision tree model 330 may determine suitable optimization parameters 320 and send the optimization parameters 320 to the backup client 110, which then configures the stream backup process on the basis of the received optimization parameters 320, thereby enhancing the efficiency of the stream backup.

In some embodiments of the present disclosure, the machine learning model in use is a decision tree model. The decision tree is a flowchart-like structure, where each internal node represents "test" for attributes, each branch denotes a result of the test and each leaf node represents a class label (decision made after calculating all attributes). A path from root to leaf represents classification rule. In decision analyzing, the decision tree and the closely related influencing diagram are used as visual and analyzing decision support tools. The decision tree may usually be used for decision analyzing to help determine a strategy which has the highest possibility of reaching a target and meanwhile is also a popular tool in machine learning.

ID3 algorithm is a decision tree algorithm. Each training instance is described as a list in the form attribute-value pair, which forms a joint description of the instances. An instance is labeled with a class to which it belongs. To simplify the discussion, assuming that the instance belongs to one of the following classes: a positive instance, which is an example of a concept (a target concept) to be learnt and a negative instance, which is an example opposite to the target concept. The ID3 algorithm may be directly applied into the above two classes. Furthermore, it is assumed that the attribute has discrete values. ID3 is a useful concept learning algorithm, it is because it can effectively build a decision tree which can be well generalized. In terms of non-incremental learning tasks, the ID3 algorithm is normally a better choice for building classification rules.

However, for incremental learning tasks, it is better to gradually accept instances without building a new decision tree every time. ID4 algorithm is a stepwise learning decision tree which supports incremental learning. Besides, a mechanism in the ID4 algorithm for determining when the attribute test is changed at the node is included in a new algorithm ID5R, which ensures to build a same decision tree as the ID3 algorithm provided with sets of training instances. However, similar to the ID4 algorithm, the ID5R cannot process digital attributes and more than two valuable attributes.

In some embodiments of the present disclosure, the decision tree model 330 may be a very fast decision tree (VFDT) model, which may be generated by using Hoeffding bound as a split condition. VFDT is a decision tree learning system based on Hoeffding tree. It may learn the Hoeffding tree within a constant time of each instance and overcome storage restrictions of traditional decision tree learners (such as, ID3, C4.5 and SLIQ) by using the Hoeffding bound. A bound is used to determine how many instances are required for each internal node of the decision tree, so as to make a importance decision statistically with respect to node splitting. One good characteristic of Hoeffding bound is that it is independent of a probability distribution of original data set, which in turn means more observations are required to reach the same conclusion as the distribution-dependent method. A key characteristic of the Hoeffding bound is that it is ensured there is a high probability that the selected attribute is identical to the attribute selected using unlimited number of instances. VFDT can process tens of thousands of instances per second using an existing hardware. Therefore, embodiments of the present disclosure train the Hoeffding tree with the VFDT algorithm to act as the decision tree model.

It should be understood that any known or to be improved VFDT algorithm or algorithms related to Hoeffding tree can be used in combination with the embodiments of the present disclosure.

Figure 4:
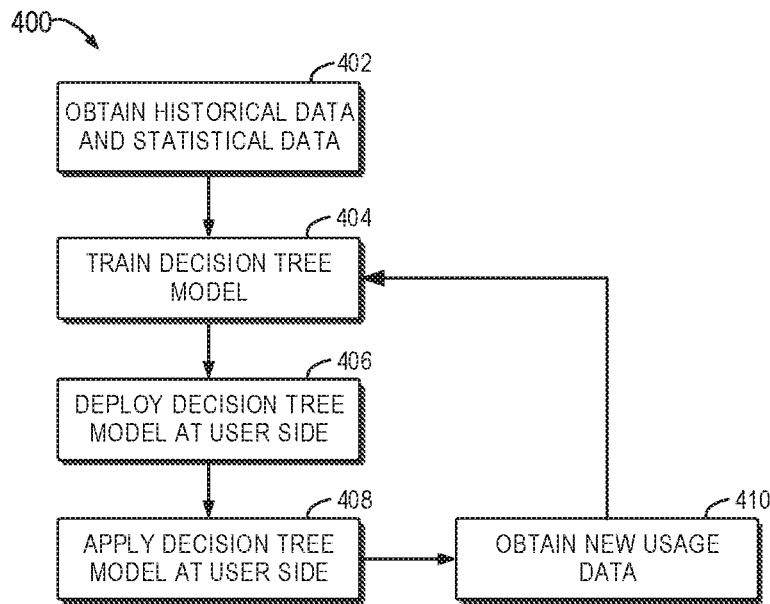
FIG. 4 illustrates a flowchart of a method for training a decision tree model in accordance with embodiments of the present disclosure.

FIG. 4 illustrates a flowchart of a method 400 for training a decision tree model in accordance with embodiments of the present disclosure. As shown in FIG. 4, historical data and statistical data are obtained as a training data set at 402 and then a decision tree model is trained with the training data set at 404. This phase may be referred to as model training before delivery. The training data set may include a historical status of a client and corresponding optimization parameters, to act as priori knowledge to help classify new data. Upon the training of the decision tree is completed, a trained decision tree model is deployed on a backup system at a user side at 406 (e.g., a device is pre-deployed with the decision tree model in accordance with embodiments of the present disclosure before delivery), and then appropriate optimization parameters are provided to users during stream backup of the backup system at 408.

At 410, new training data is obtained. Due to the limitation of the historical data and statistical data, they may not be suitable for all real scenarios. Although the decision tree model may generate an optimal solution for respective scenarios due to its generalization capability, the recommended solution may not be a real optimal solution. Accordingly, during an actual stream backup, if users, for some reason, choose a solution different from the one recommended by the decision tree model (a user-intervened solution) and the effect of the solution chosen by the users is better (e.g., processing speed is faster), the data of the user-chosen solution may be collected and be taken as new training data. Afterwards, an incremental training (without a complete repetitive training) is performed on the decision tree model at 404. In other words, the data of the user-intervened solution serves as new learning samples for a next round of training for the decision tree model. In some embodiments, the Hoeffding tree, which is suitable for big data incremental learning, may be used as the decision tree model in the embodiments of the present disclosure. In this way, the accuracy of the decision tree model under training can be further improved.

Figure 5:
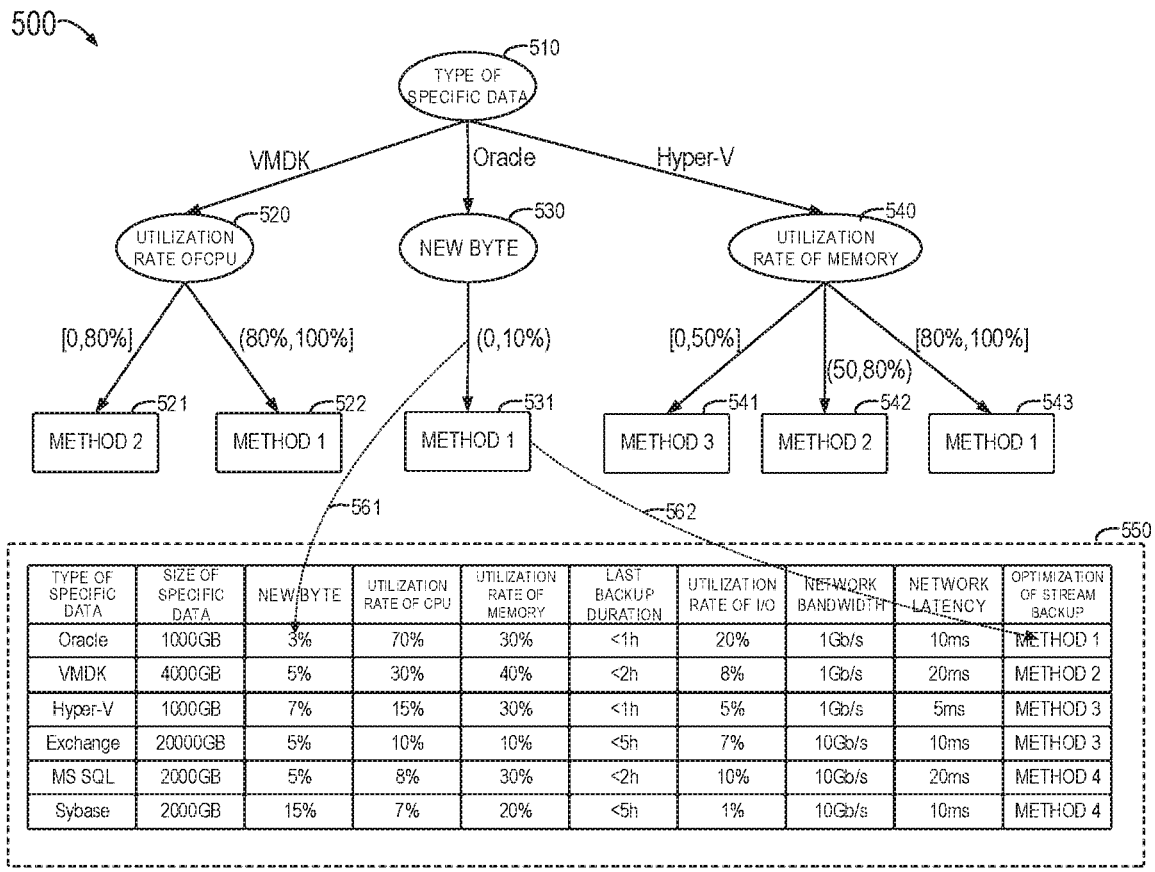
FIG. 5 illustrates a schematic diagram of a portion of an example decision tree model in accordance with embodiments of the present disclosure.

FIG. 5 illustrates a schematic diagram of a portion of an example decision tree model 500 in accordance with embodiments of the present disclosure. For example, the decision tree model 500 may be a classification model which is generated automatically using the VFDT algorithm on the basis of test data sets. In the example of FIG. 5, a root node 510 for example is "type of specific data;" if the type of the specific data to be backed up is VMDK, it is connected to a leaf node 520 "utilization rate of CPU" through sides; if the type of the specific data to be backed up is Oracle, it is connected to a leaf node 530 "new byte" through sides; if the type of the specific data to be backed up is Hyper-V, it is connected to a leaf node 540 "utilization rate of memory" through sides.

Next, at the leaf node 520, if the utilization rate of the CPU is below or equal to 80%, optimization parameters of the second method are selected as shown by 521; if the CPU utilization rate exceeds 80%, optimization parameters of the first method are selected as shown by 522. Optimization parameters of each method may be preset by technical and research staffs. In this way, one of the several preset optimization parameters is selected, which can generate more appropriate optimization parameter combinations than a neural network. For example, the optimization parameters of the first method may be: the concurrent number of data parsing is 2, the size of a buffer area for storing the parsed data is 1 MB, the concurrent number of stream transmission is 2 and the chunk size of the stream transmission is 8 KB. The optimization parameters of the second method may be: the concurrent number of data parsing to 4, the size a buffer area for storing the parsed data is 512 KB, the concurrent number of stream transmission is 2 and the chunk size of the stream transmission is 4 KB. The optimization parameters of the third method may be: the concurrent number of data parsing is 16, the size of a buffer area for storing the parsed data to 512 KB, the concurrent number of stream transmission is 2 and the chunk size of the stream transmission is 4 KB. Optimization parameters of the fourth method may be: the concurrent number of data parsing is 32, the size of a buffer area for storing the parsed data to 2 MB, the concurrent number of stream transmission is 4 and the chunk size of the stream transmission to 64 KB. It should be appreciated that although FIG. 5 only illustrates 4 example optimization methods, more optimization methods may be included.

Similarly, at the leaf node 530, if a proportion of new bytes in the specific data to be backed up is below 10%, the optimization parameters of the first method are selected as shown in 531. At the leaf node 540, if the utilization rate of memory is below or equal to 50%, the optimization parameters of the third method are selected as shown in 541; if the utilization rate of memory exceeds 50% and is below 80%, the optimization parameters of the second method are selected as shown in 542; if the utilization rate memory exceeds 80%, the optimization parameters of the first method are selected as shown in 543.

With continued reference to FIG. 5, data 550 may be training data for training the decision tree model 500, for example, historical usage data. It should be understood that there may be a large amount of stripe data in the training data. As shown by dotted line 561, when the proportion of new bytes in the Oracle data type is below 10%, the optimization parameters of the first method are selected as indicated by dotted line 562. It is to be appreciated that FIG. 5 only shows a portion of the example decision tree mode and an actual decision tree model also includes more nodes and sides or different nodes and sides. Moreover, FIG. 5 is only an example of the decision tree model and is not intended for limiting the protection scope of the present disclosure.

When the decision tree model 500 is generated after training, according to the obtained values of influencing factors (even new data never appeared in the training data), the decision tree model 500 can automatically determine and recommend appropriate optimization parameters for new stream backup scenarios. In addition, as the decision tree model in the embodiments of the present disclosure are trained with a large amount of training data, it can achieve a higher accuracy than the manually set optimization parameters.

The Hoeffding-based tree is built after self-learning of historical data. Some data of the backup client may be collected regularly and average values of the data is also calculated. Several methods for obtaining the average values may be selected, e.g., geometric mean, harmonic mean, weight mean and quadratic mean. The periodically average data of the backup client is input to a processor for incremental training to enrich the current decision tree model. For example, when it is required to adjust the backup client, it means that its dataset or I/O usage has changed during a period of time. Therefore, the system may correspondingly determine a new optimization method for the stream backup, thereby protecting the data more safely and more efficiently.

In some embodiments, if users choose not to perform the dynamic stream backup optimization on one or more backup clients, then it is possible to make the statistical data of these backup clients not being collected periodically and thus their stream backup optimization method will not be affected.

Figure 6:
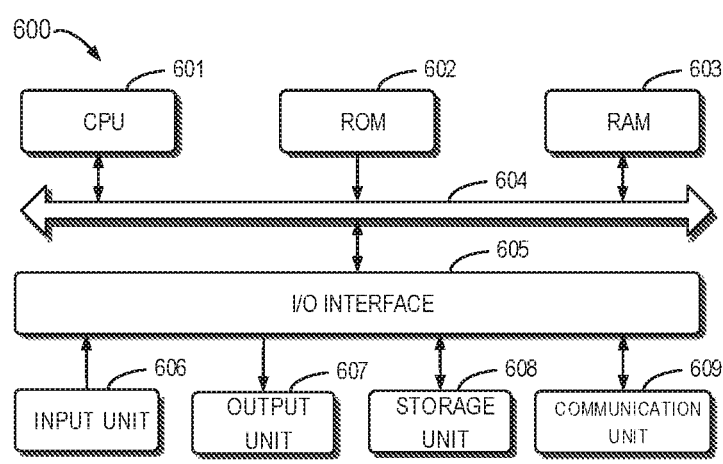
FIG. 6 illustrates a schematic block diagram of a device for implementing embodiments of the present disclosure.

FIG. 6 illustrates a schematic block diagram of a device 600 for implementing embodiments of the present disclosure. The device 600 can be a device or apparatus described by embodiments of the present disclosure. As shown, the device 600 includes a central processing unit (CPU) 601, which can execute various suitable actions and processing based on the computer program instructions stored in a read-only memory (ROM) 602 or computer program instructions loaded in the random-access memory (RAM) 603 from a storage unit 608. The RAM 603 may also store all kinds of programs and data required by the operations of the device 600. The CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as a keyboard, a mouse and the like; an output unit 607, e.g., various kinds of display and loudspeakers etc.; a storage unit 608, such as a disk and an optical disk etc.; and a communication unit 609, such as a network card, a modem, a wireless transceiver and the like. The communication unit 609 allows the device 600 to exchange information/data with other devices via the computer network, such as Internet, and/or various telecommunication networks.

The above described method or procedure can be executed by the processing unit 601. For example, in some embodiments, the method may be implemented as a computer software program tangibly included in the machine-readable medium, e.g., the storage unit 608. In some embodiments, the computer program can be partially or fully loaded and/or mounted to the device 600 via the ROM 602 and/or communication unit 609. When the computer program is loaded to the RAM 603 and executed by the CPU 601, one or more steps or acts of the above described method or process can be implemented.

In some embodiments the above described method and process may be implemented as computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing apparatuses. The computer-readable storage medium may be, but not limited to, an electrical storage device, a magnetic storage device, an optical storage device, an electromagnetic storage device, a semiconductor storage device or any appropriate combination of the above. More concrete examples of the computer-readable storage medium (non-exhaustive list) include: a portable computer disk, hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions herein may be downloaded from the computer-readable storage medium to each computing/processing device, or to an external computer or external storage via Internet, a local area network, a wide area network and/or wireless network. The network may include a copper-transmitted cable, an optical fiber transmission, a wireless transmission, a router, a firewall, a switch, a network gate computer and/or an edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, micro-codes, firmware instructions, state setting data, or source codes or target codes written in any combinations of one or more programming languages, wherein the programming languages consist of object-oriented programming languages and traditional procedural programming languages, e.g., "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including a local area network (LAN) and a wide area network (WAN), or to an external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit can execute computer-readable program instructions to implement various aspects of the present disclosure.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded into a computer, other programmable data processing apparatuses or other devices, so as to execute a series of operation steps on the computer, other programmable data processing apparatuses or other devices to generate a computer-implemented process. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by a device, a method and a computer program product according to multiple embodiments of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable others of ordinary skill in the art to understand respective embodiments of the present disclosure.

We claim:

1. A method of backing up data, comprising:
    obtaining a data attribute of specific data to be backed up from a client to a server, a resource utilization rate at the client, and a network condition between the client and the server;
    setting, based on the data attribute, the resource utilization rate and the network condition, a plurality of parameters for performing stream backup, the plurality of parameters at least comprising a concurrent number of stream transmission and a concurrent number of data parsing, wherein setting the plurality of parameters comprises:
        sending, to a trained decision tree model, the data attribute, the resource utilization rate and the network condition; and
        receiving, from the trained decision tree model, the concurrent number of the data parsing, a size of a buffer area for storing parsed data, the concurrent number of the stream transmission, and a chunk size of the stream transmission; and
    parsing, according to the plurality of parameters, the specific data and backing up the specific data from the client to the server.

2. The method of claim 1, further comprising:
    collecting historical data related to stream backup as a training data set, each record in the training data set at least comprising the data attribute, the resource utilization rate, the network condition and corresponding optimization parameters; and
    training the decision tree model using the collected training data set to obtain the trained decision tree model.

3. The method of claim 2, wherein training the decision tree model using the collected training data set comprises:
    building a very fast decision tree (VFDT) model by using Hoeffding bound as a split condition.

4. The method of claim 3, further comprising:
    deploying the built VFDT model in a backup system;
    collecting optimization parameters configured by a user as new training data during user utilization of the backup system; and
    training the VFDT model using the new training data in an incremental way.

5. The method of claim 1, wherein obtaining the data attribute and the resource utilization rate comprises:
    obtaining a type of the specific data, a size of the specific data, a proportion of new bytes in the specific data, a utilization rate of a processing resource at the client, a utilization rate of a storage resource at the client, and a utilization rate of input/output (I/O) resources at the client.

6. The method of claim 5, wherein obtaining the network condition comprises:
    obtaining a duration of last backup, and a network bandwidth and a network latency between the client and the server.

7. The method of claim 5, wherein the type of the specific data comprises any of a database, a virtual machine file and an email file.

8. An electronic device, comprising:
    a processing unit; and
    a memory coupled to the processing unit and storing instructions, the instructions, when executed by the processing unit, causing the device to perform a method, the method comprising:
        obtaining a data attribute of specific data to be backed up from a client to a server, a resource utilization rate at the client, and a network condition between the client and the server;
        setting, based on the data attribute, the resource utilization rate and the network condition, a plurality of parameters for performing stream backup, the plurality of parameters at least comprising a concurrent number of stream transmission and a concurrent number of data parsing, wherein setting the plurality of parameters comprises:
            sending, to a trained decision tree model, the data attribute, the resource utilization rate and the network condition; and
            receiving, from the trained decision tree model, the concurrent number of the data parsing, a size of a buffer area for storing parsed data, the concurrent number of the stream transmission, and a chunk size of the stream transmission; and
        parsing, according to the plurality of parameters, the specific data and backing up the specific data from the client to the server.

9. The electronic device of claim 8, wherein the acts further comprise:
    collecting historical data related to stream backup as a training data set, each record in the training data set at least comprising the data attribute, the resource utilization rate, the network condition and corresponding optimization parameters; and training the decision tree model using the collected training data set to obtain the trained decision tree model.

10. The electronic device of claim 9, wherein training the decision tree model using the collected training data set comprises:

building a very fast decision tree (VFDT) model by using Hoeffding bound as a split condition.

11. The electronic device of claim 10, wherein the method further comprises:

deploying the built VFDT model in a backup system;

collecting optimization parameters configured by a user as new training data during user utilization of the backup system; and training the VFDT model using the new training data in an incremental way.

12. The electronic device of claim 8, wherein obtaining the data attributes and the resource utilization rate comprises:

obtaining a type of the specific data, a size of the specific data, a proportion of new bytes in the specific data, a utilization rate of a processing resource at the client, a utilization rate of a storage resource at the client, and a utilization rate of input/output (I/O) resources at the client.

13. The electronic device of claim 12, wherein obtaining the network condition comprises:

obtaining a duration of last backup, and a network bandwidth and a network latency between the client and the server.

14. The electronic device of claim 12, wherein the type of the specific data comprises any of a database, a virtual machine file and an email file.

15. A computer program product being tangibly stored on a non-transitory computer-readable medium and comprising computer-executable instructions, which, when executed, causes a machine to perform a method, the method comprising:

obtaining a data attribute of specific data to be backed up from a client to a server, a resource utilization rate at the client, and a network condition between the client and the server;

setting, based on the data attribute, the resource utilization rate and the network condition, a plurality of parameters for performing stream backup, the plurality of parameters at least comprising a concurrent number of stream transmission and a concurrent number of data parsing, wherein setting the plurality of parameters comprises:

sending, to a trained decision tree model, the data attribute, the resource utilization rate and the network condition; and receiving, from the trained decision tree model, the concurrent number of the data parsing, a size of a buffer area for storing parsed data, the concurrent number of the stream transmission, and a chunk size of the stream transmission; and parsing, according to the plurality of parameters, the specific data and backing up the specific data from the client to the server.

16. The computer program product of claim 15, wherein the method further comprises:

collecting historical data related to stream backup as a training data set, each record in the training data set at least comprising the data attribute, the resource utilization rate, the network condition and corresponding optimization parameters; and training the decision tree model using the collected training data set to obtain the trained decision tree model.

17. The computer program product of claim 16, wherein training the decision tree model using the collected training data set comprises:

building a very fast decision tree (VFDT) model by using Hoeffding bound as a split condition.

* * * * *